Figure 1:
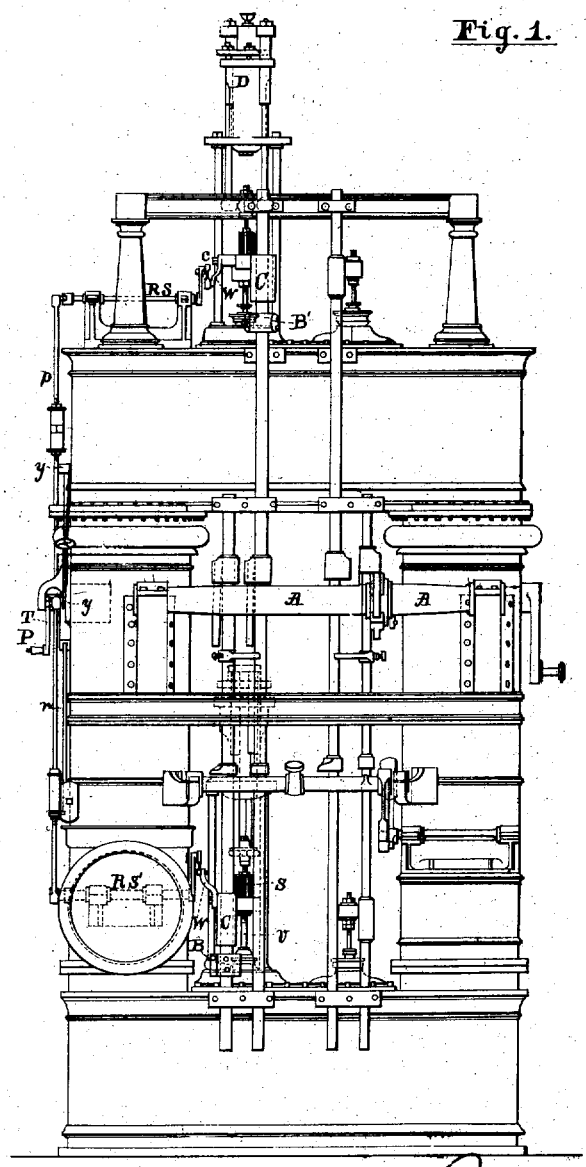

6 Sheets—Sheet 1.

E. N. DICKERSON.

VALVE-GEAR OF STEAM-ENGINES.

No. 7,763. Reissued June 26, 1877.

Witnesses:

Everett Spick

Aug. A. Nicholson.

Inventor:

Edward N. Dickerson by

A. Pollok his atty.

6 Sheets—Sheet 2.

E. N. DICKERSON.

VALVE-GEAR OF STEAM-ENGINES.

No. 7,763. Reissued June 26, 1877.

Witnesses:

Burella Sick

Aug. A. Nicholson

Inventor:

Edward N. Dickerson by

A. Pollok his atty.

6 Sheets—Sheet 3.

E. N. DICKERSON.

VALVE-GEAR OF STEAM-ENGINES.

No. 7,763. Reissued June 26, 1877.

Witnesses:

Burell a Sick

Aug. A. Richardson

Inventor:

Edward N. Dickerson by

A Pollok his atty.

E. N. DICKERSON.

VALVE-GEAR OF STEAM-ENGINES.

No. 7,763. Reissued June 26, 1877.

Witnesses:

Ewell A. Dick

Aug. A. Nicholson

Inventor:

Edward N. Dickerson by

A. Pollok his atty.

E. N. DICKERSON. 6 Sheets--Sheet 5.
VALVE-GEAR OF STEAM-ENGINES.
No. 7,763. Reissued June 26, 1877.
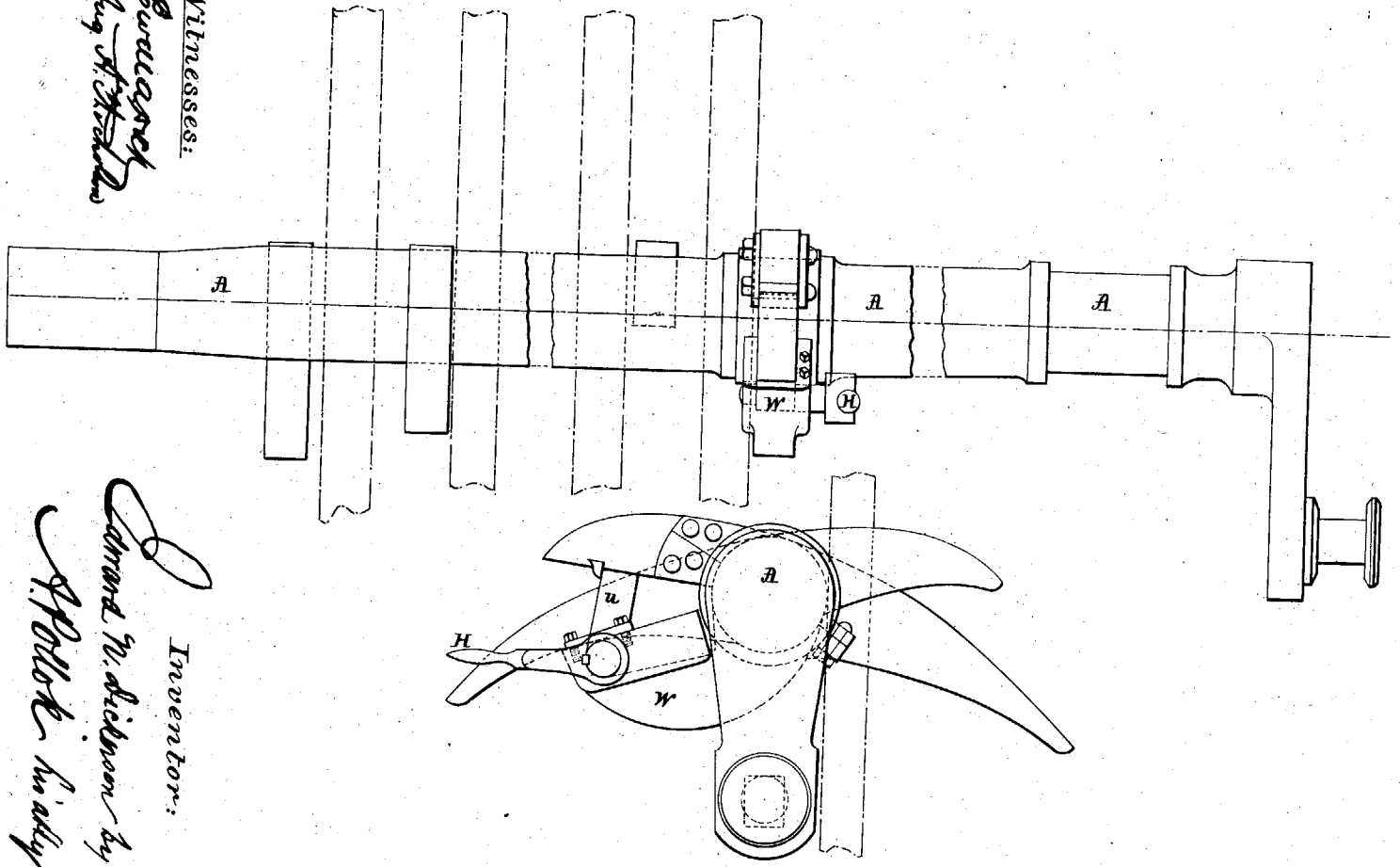
Witnesses:
Edwd A. Rech
Aug. A. Nicholson
Inventor:
Edward N. Dickerson by
A. Pollok his atty.

E. N. DICKERSON. 6 Sheets—Sheet 6.
VALVE-GEAR OF STEAM-ENGINES.
No. 7,763. Reissued June 26, 1877.
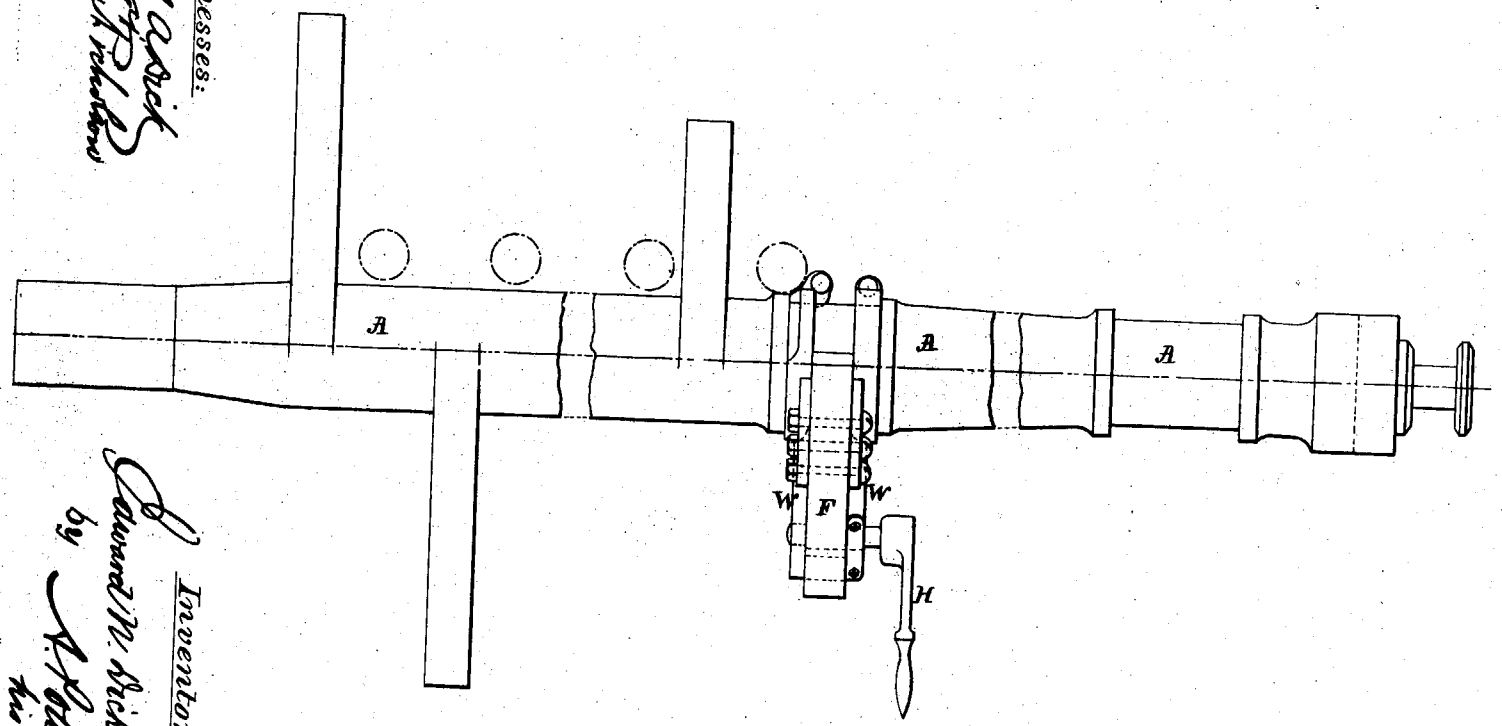
Witnesses:
Ewell A. Brick
Aug. A. Nicholson
Inventor:
Edward N. Dickerson
by A. Pollok
his atty.

UNITED STATES PATENT OFFICE.

EDWARD N. DICKERSON, OF NEW YORK, N. Y.

IMPROVEMENT IN VALVE-GEARS OF STEAM-ENGINES.

Specification forming part of Letters Patent No. 68,853, dated September 17, 1867; reissue No. 7,762, dated June 26, 1877; application filed June 5, 1877.

*To all whom it may concern:*

Be it known that I, EDWARD N. DICKERSON, of the city and State of New York, have invented a new and useful Improvement in the Valve-Gear of Steam-Engines, of which the following is a description, reference being had to the accompanying drawings, making a part thereof, in which—

Sheets No. 1 and No. 2 represent a complete drawing, in two elevations, of my improvements as applied to a double-valve eighty-one inch beam engine, together with a section of my improved "dash-pot." Sheets Nos. 3 and 4 represent the details of the lifting and tripping apparatus of the steam-valves; and Sheets Nos. 5 and 6, the details of the rock-shaft for working the exhaust and steam valves, whose peculiarity is in its exhaust-valve arrangements.

The same letters are used to designate the same parts on the different drawings.

The essential conditions for working steam advantageously in a steam-engine are these:

First, that the steam-valve should begin to open slowly, so as to impose the strain of the boiler-pressure upon the piston and its connections by degrees, instead of suddenly, as is usually done; and the reason is that the rectilineal motion of the piston is exceedingly small at or near the center for a comparatively long arc of rotation, while the friction incident to the rotary motion of the shaft and crank-pin journals, under a great pressure, is exceedingly large in proportion, and therefore pressure on the piston at or near the center is a loss of power, while, at the same time, the consequence of opening the valve suddenly is to impart a blow which develops heat in the journals by impact, makes it necessary to key up the engine very close, to avoid the jar incident to taking up the slack motion of the connections suddenly, and thus excludes oil, and, in consequence, induces hot journals and abrasion.

Second, that after the full boiler-pressure has been once imparted to the piston gradually, and it begins to move rapidly, and thus create a demand for steam in the cylinder, then that the opening should be sufficiently rapid and large to supply that demand without wire-drawing the steam.

Third, that the steam-valve should be shut with intense rapidity when the time for effecting the cut-off has arrived, so as to prevent any loss in wire-drawing the steam by slow closing.

Fourth, that the cut-off should be accurate and uniform in its action, unaffected by the spring of the parts or the different degrees of pressure or lubrication.

Fifth, that the exhaust-valve should be opened before the piston reaches the opposite end of the cylinder, at from thirty to forty degrees of the revolution of the crank, (varying with the speed of rotation,) so that the time necessary for condensation shall be taken while the piston is moving the least in proportion to the circular motion of the crank, and therefore while the least loss is sustained by withdrawing the pressure from it; while, at the same time, the exhaust-valve at the end of the cylinder which the piston is approaching shall be held open till the piston reaches the end of its stroke, so that no retardation shall be sustained by compressing the steam and making a "cushion" under the piston.

To comply with these conditions practically is the object of these improvements.

In the accompanying drawings, A represents the rock-shaft, which in this engine works all the valves; but it may be made in two or four parts, according to circumstances, retaining the same mode of operation. B is a fixed lifter permanently attached to the steam lifting-rod, which operates on the steam-valve stem V only through the intermediate agency of another lifter, C, which is loose upon the lifting-rod, and which depends upon the fixed lifting-rod and lifter B by the stud E, which rests upon the lever L, centered on the fixed lifter B at one end, having a fulcrum, *x*, (which, in this case, is the bonnet of the valve-chest,) to support its other end. The lever L is made adjustable by the screw I, which, being turned, shoves the block M upon which the lever is centered, and which slides in a groove cut into the lifter B, so that the relative positions of the fulcrum, the center of vibration, and the point on the lever where the upper lifter is supported, may be changed without changing the position of the stud C in respect to the valve-stem, and, as a consequence, the speed of the initial lift may be altered at pleasure, so as to admit the steam to the cylinder slowly enough to produce the desired result. The adjustment of this lever may be dispensed with, and the lever fixed permanently, but the result is not so good.

By this arrangement, it is apparent that when the lifting-rod begins to rise the valve itself and the lifter C will rise much slower, since their motion is reduced by the interposition of the lever between them and the fixed lifter; but the speed of opening will be increased as the lever continues to rise and to elongate the lever by bringing successive points into contact with its lower curved surface. When, however, the lower lifter B has overtaken the upper one, C, by closing up the gap left between them, (whose width in this case is about two inches, and is measured by the length of the stud E,) then the valve will continue to rise with the motion of the lifting-rod.

The lever itself may be made long enough and so shaped as to impart the increased motion without ceasing to act on the valve, which is the best way in fast-moving engines. Thus the first and second essentials for working steam advantageously are complied with.

The dash-pot as improved by me is shown on Sheets No. 1 and No. 2, and marked D.

Figure 2:
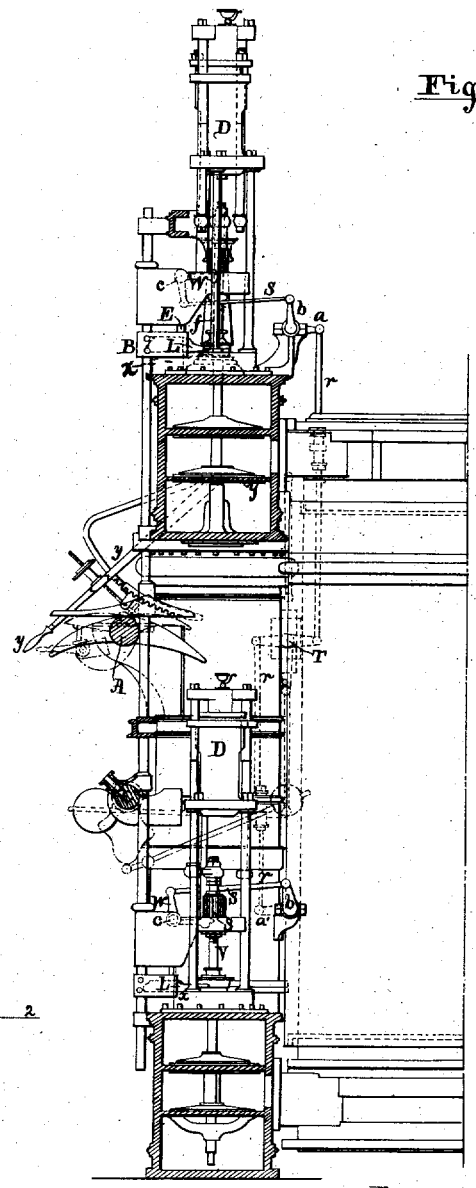
Figure 3:
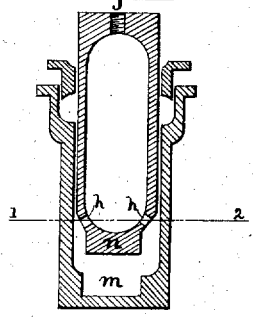
Figures 1, 2:
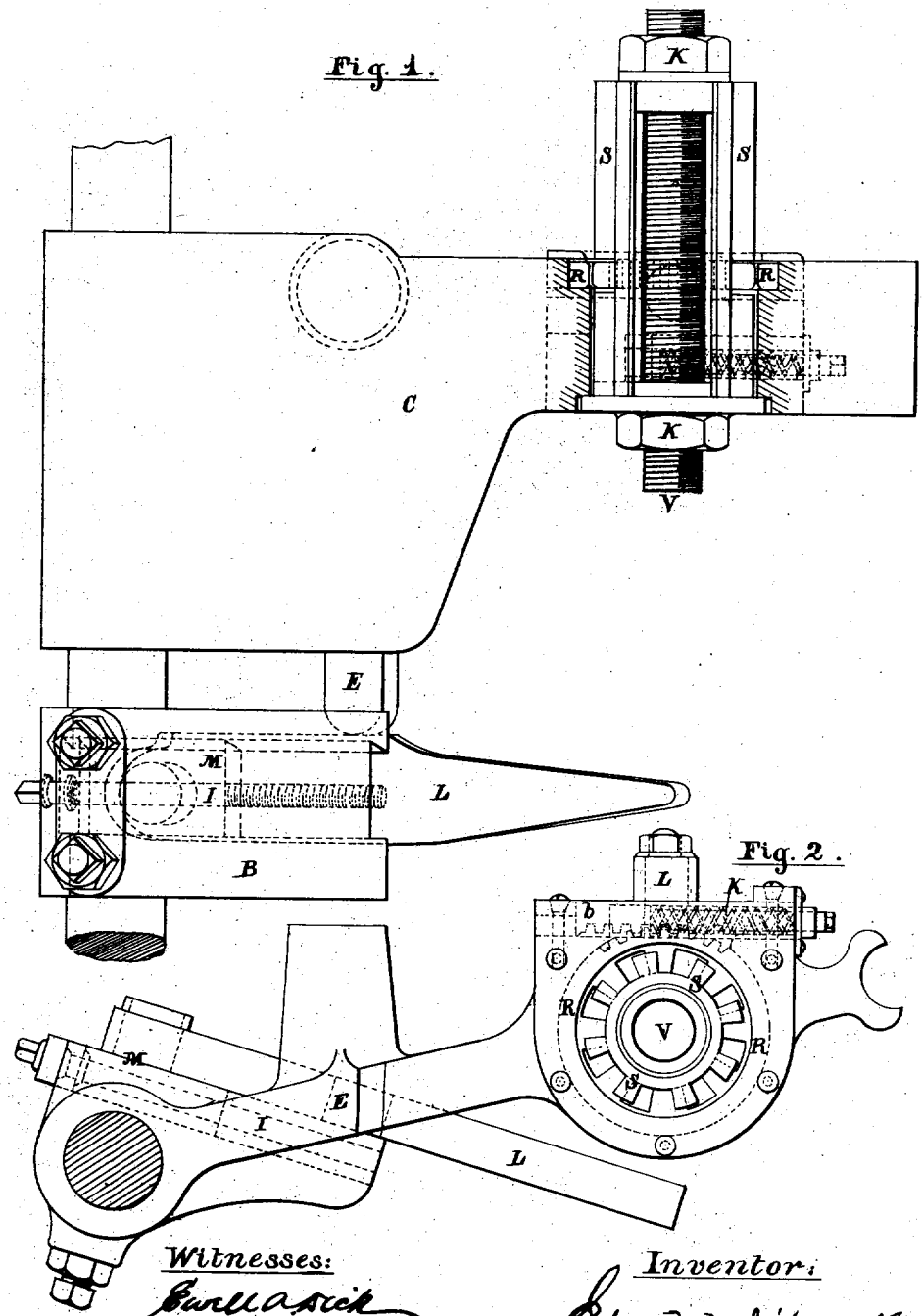

In Figures 1 and 2 it is shown, in connection with the valves, set on three legs overhead the valves, and connected with the valve-stems by two suspension-rods and a cross-head underneath, which is the best arrangement ordinarily, although it may be placed otherwise for the sake of convenience. Fig. 3 shows, in a vertical section, the construction of this new dash-pot; and Fig. 4, a section through the interior plunger at 1 2.

Its peculiarity consists in having two cylinders, one fitting inside the other, having the arresting-plunger *n* fixed on the inside cylinder, of smaller diameter than itself, which, by confining the fluid used in the chamber *m*, arrests the descent of the plunger, and so of the valve it controls. This machine is to be filled with some fluid, (water is the best,) which may be done through a hole in its top, fitted with a cock or plug, and which supplies the chamber *m* through the apertures *h h*. If this machine is filled full of water and well packed by the stuffing-box, the air will be excluded entirely, and, as the interior cylinder is raised, an atmospheric vacuum is left under the plunger, which is therefore forced down with high speed by the pressure of the air when released and allowed to drop. The size of the dash-pot in the drawing is such as to make the pressure equal to about six hundred pounds, if full of water. If half full, the pressure is less, and thus any desired amount of spring-pressure can be given to shut the valve with intense speed, while the plunger below will arrest it in time to prevent damage to the valves, by confining the fluid with which it is filled in the chamber *m*, like the Sickels cut-off.

To accomplish the fourth essential, I have invented a new tripping apparatus and a new mechanism for engaging the valves with and disengaging them from the lifter by which they are opened.

The first part consists in centering the "tripper" W on the lifter which lifts the valve itself, so that its action in tripping is accurate and reliable; whereas, by the old methods, in which the tripper was centered on some other part of the engine than the lifter, the accuracy of its action was impeded by the spring between the parts, and was affected by the degree of lubrication.

The operation of this tripper will be seen in Fig. 2, Sheets No. 1 and No. 2, where the tripper W is centered at *c*, and derives its motion from the rod *s*, which is connected to one end of the bell-crank *b*, and which is caused to vibrate by the rod *r*, which is connected to one end of the double bell-crank T, which is made to vibrate the required distance (which in this case is about eleven inches) by attaching to the pin P a connecting-rod made to move with the motion of the piston, or other desired motion, backward and forward, as described by Mr. Sickels in his patent of September, 1845, thus causing the tripper W to vibrate backward and forward through an arc of about forty degrees, and to pass at each stroke the roller or cam which it is designed to strike and by which it operates to disengage the valve from the lifter. The double bell-crank T is centered upon a sliding block set in a vertical slot, and may be raised or lowered at pleasure by the handle Y or any other suitable contrivance for adjusting its position, and by that means the point of cut-off is varied at pleasure, with great uniformity. This tripping apparatus may be made to work in combination with any method for engaging and disengaging the valves.

My new detaching apparatus is shown in detail in Sheets Nos. 3 and 4, where—

Figure 4:
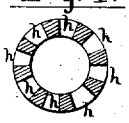
Figure 5:
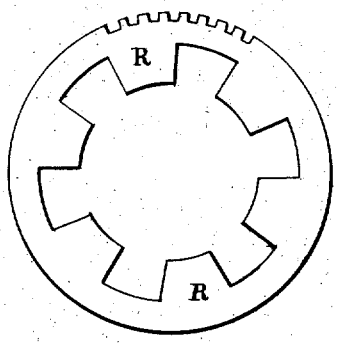
Figure 6:
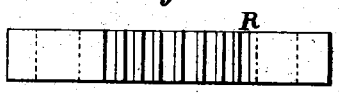
Figure 4:
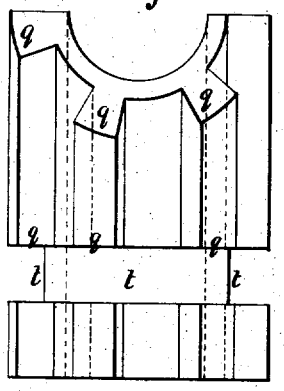
Figure 3:
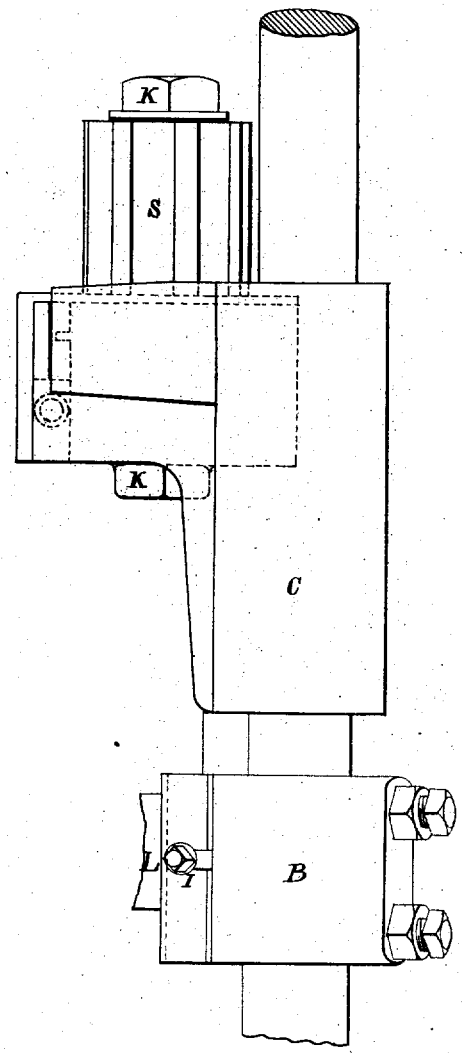

Fig. 1 represents a section of the apparatus in working order; Fig. 2, a plan of the same; Fig. 3, an elevation of it from the engine-room; Fig. 4, a side elevation and a half section, in the same drawing, of the collar; and Figs. 5 and 6, a plan and side elevation of the vibrating die.

S is a circular collar with a number of radial ribs projecting from it, running from end to end, parallel with the central axis, between which channels are left, separating the ribs, which are marked *g g*. This collar is slipped over the valve-stem, which it surrounds at a free distance, so as not to bind it, and is held in its vertical position by nuts on the valve-stem above and below it, *k k*. When in position, this collar must be prevented from vibrating around the valve-stem, which is done by a dog fixed to the lifter and projecting into one of the channels. This collar is small enough in external diameter to pass through a hole in the lifter, which is made to receive it, so that the lifter may be raised above it if need be. The vibrating die R has radial projections, pointing toward its center, which correspond with the channels in the collar S, but are narrower than they are, so that it can be slipped down outside of the collar, with the interior projections entering the channels of the collar, and so brought to rest in a recess formed in the lifter C to receive it, as shown in Fig. 1, in such a relative position to the circular channel *t*, which is cut round the collar S, that it can turn freely in that channel around the collar S. The outside edge of a segment of the vibrating die is cut with teeth, and a rack, *b*, is made to fit into them, on which the roller L is fixed, so that when the rack *b* is moved endwise the die R is caused to vibrate; but other means of turning it may be used. The position in which the die R is set when at rest is such that its radial projections are under the ribs *g g* of the collar S, as shown in plan at Fig. 2, so that when the lifter is raised it carries up the die R and with it the collar S and the valve-stem and valve attached to it. But when the roller L is moved it vibrates the die R, so as to bring its radial projections to agree with the channels in the collar S, and the collar, being no longer supported, will slip down through the lifter, and so close the valve and produce the cut-off. When the lifter returns to its lowest position again it brings back with it the die R, and as soon as it passes into the circular channel *t* the spring K forces the rack *b* back again, and so brings the die R under the ribs *g g*, ready for another lift.

The peculiarity of this engaging and disengaging apparatus is that the moving part of it vibrates around a center, instead of moving in some other direction, in reference to the valve-stem, whereby a uniform lift of the valve can be got, much greater surface to endure the abrasion at the instant of tripping, and much greater accuracy in the time of tripping. One or more projections may be used, but for heavy valves the more the better. On large single valves, to cut off short, I should recommend the use of twenty inches of length of edges in contact at the instant of tripping.

By these improvements in the tripping apparatus the fourth essential condition is secured.

Sheets Nos. 5 and 6 exhibit in detail the rock-shaft A, as shown in operation in the general drawing in Sheets Nos. 1 and 2. When the exhaust-toes are in working position, as shown by the dotted lines, the valves will be operated as necessary to produce the effect described. And on a beam-engine made from these drawings the eccentric would be set with a lead of about twenty degrees in advance of the line of the crank on the shaft, so that one exhaust-valve would be open about two inches when the piston reached the end of the stroke, while the other one would close only when the piston had reached the end of the stroke. If the engine has to be worked by hand, however, by the use of a trip-shaft, then one of the exhaust-toes must be dropped out of the way, or both exhaust-valves will be open at the same time, and the engine cannot be moved by the trip-shaft. To effect this improvement in the manner of removing this toe is the object of this part of the improvement, and it is done by having one of the exhaust-toes F loose on the shaft, so that it can be vibrated a short distance around its center, while a permanent toe, W, supports the foot of the stud U, which is set on a center in a recess made in the toe W, and which can be turned to drop into that recess by the handle H, so that the toe which it supports may fall to the level of the top of the toe W, and thus come down so low as to permit the lifting-rod to close the exhaust-valve. In that situation the engine can be worked by hand by the trip-shaft.

Of course these improvements are applicable to all sorts of engines and all sorts of valves where the steam-valve is independent of the exhaust, and is to be tripped.

What I claim as my invention, and desire to secure by Letters Patent, is—

1. The combination of the two lifters on the same lifting-rod, one being fixed to it and the other sliding upon it, and the lever, for the purpose of effecting the reduction of the initial motion of opening steam-valves, substantially as described.

2. The combination of the lever for opening the steam-valve gradually with the fixed and movable lifters, the one being moved by the motion of the lifting-rod, and the other supporting a separate disengaging apparatus, substantially as described.

3. A lever, one end of which is raised by the fixed lifter on the lifting-rod, and by which the steam-valve is pried open gradually, so arranged that it can be adjusted to vary the speed of lifting by shifting the position of the fulcrum on the fixed lifter to which the lifting power is applied, substantially as described.

4. The vibrating tripper, centered upon the lifter itself, which opens the valve, as distinguished from a tripper which is centered on some other part of the machine, substantially as described.

5. The vibrating die for engaging and disengaging the valve-stem to effect a cut-off, so arranged that it will vibrate in an arc whose concave side is presented to the valve-stem, substantially as described.

6. The collar which surrounds the valve-stem, having one or more radial ribs upon it, for the purpose of co-operating with a movable die to effect a cut-off, substantially as described.

7. A dash-pot whose plunger is composed of two cylinders of unequal diameters, the smaller of which is the arresting-plunger, forming the bottom of the larger one, and whose exterior chamber is composed of a cup or secondary reservoir to receive the arresting-plunger, and above it a confining-vessel to guide the larger cylinder of the plunger and to exclude the air, substantially as described.

8. The combination, in a rock-shaft, of one false exhaust-toe and one fixed one, by which it is supported, with a stud or prop between them, so arranged that it can be dropped or elevated at pleasure, substantially as described.

9. The vertically-adjustable double bell-crank T, in combination with the two single bell-cranks *b b* and connecting-rods *r r*, for the purpose of actuating trippers to unlatch valve-stems from their lifters, to effect a variable cut-off on steam-engines, substantially as described.

10. For the purpose of engaging and disengaging the valve-stem of a cut-off valve with and from the lifter, a collar surrounding the valve-stem, and armed with projecting ribs arranged on opposite sides of the valve-stem, in combination with a solid die acted on by the tripper, supported by the lifter and surrounding the valve-stem, armed with projecting points corresponding with the ribs of the collar, so that the valve-stem shall be equally supported on both sides of the center in lifting the valve, and, at the same time, have a long surface of contact between the die and collar, to endure the abrasion of tripping when the die is moved, substantially as described.

EDW. N. DICKERSON.

Witnesses:

WM. S. BEAMAN,
GEO. H. EVANS.